(12) United States Patent
Shields

(10) Patent No.: US 6,884,084 B2
(45) Date of Patent: Apr. 26, 2005

(54) CONDUCTIVE INTERIOR LINER FOR A VEHICLE

(75) Inventor: Scott Shields, White Lake, MI (US)

(73) Assignee: Intier Automotive, Inc., Aurora (CA)

( * ) Notice: Subject to any disclaimer, the term of this patent is extended or adjusted under 35 U.S.C. 154(b) by 0 days.

(21) Appl. No.: 10/256,387

(22) Filed: Sep. 27, 2002

(65) Prior Publication Data
US 2003/0098614 A1 May 29, 2003

Related U.S. Application Data

(60) Provisional application No. 60/325,602, filed on Sep. 28, 2001.

(51) Int. Cl.⁷ .............................................. H01R 33/00
(52) U.S. Cl. ......................................... 439/34; 296/214
(58) Field of Search ............................ 296/214; 439/34

(56) References Cited

U.S. PATENT DOCUMENTS

| | | | | |
|---|---|---|---|---|
| 4,414,265 A | * | 11/1983 | Rosato et al. .................. 442/55 |
| 4,741,945 A | * | 5/1988 | Brant et al. .................. 428/158 |
| 4,798,756 A | * | 1/1989 | Fukushima et al. .......... 428/198 |
| 5,007,976 A | * | 4/1991 | Satterfield et al. ........... 156/222 |
| 5,016,934 A | * | 5/1991 | Pelz ............................ 296/214 |
| 5,415,554 A | | 5/1995 | Kempkers et al. ............. 439/34 |
| 5,582,906 A | | 12/1996 | Romesberg et al. ........... 442/55 |
| 6,036,501 A | | 3/2000 | Wojewnik et al. ........... 439/931 |
| 6,095,840 A | | 8/2000 | Yamaguchi et al. ......... 439/247 |
| 6,107,569 A | | 8/2000 | Shields et al. ............. 174/72 A |
| 6,126,228 A | | 10/2000 | Davis et al. .............. 296/146.7 |
| 6,191,364 B1 | | 2/2001 | Byrne ....................... 174/72 A |
| 6,273,499 B1 | | 8/2001 | Guyon ........................ 296/214 |

* cited by examiner

Primary Examiner—Hae Moon Hyeon
(74) Attorney, Agent, or Firm—Honigman Miller Schwartz and Cohn LLP (57) ABSTRACT

A conductive liner includes an electrically non-conductive core layer between two electrically conductive layers. At least one of the two electrically conductive layers includes conductive particles. The electrically conductive layers are capable of conducting sufficient electricity to power at least one electrical component in a vehicle. In a preferred embodiment, the conductive particles are fibers, such as carbon fibers, or the like that are preferably homogeneously dispersed within the conductive layer. The conductive fiber layers provide structural reinforcement to the liner, in addition to providing electrical conductivity. The conductive liner can further include a top and bottom scrim/adhesive layer, as well as a decorative, cover material layer. The present invention eliminates the need for a separate wiring and wire harness as in conventional liners. When the conductive layer comprises reinforcing fiber, the present invention also eliminates the need to have non-conductive reinforcing material, such as fiberglass reinforcing layers to sandwich the core layer of the liner. A method of making the electrically conductive liner of the invention is also disclosed.

15 Claims, 8 Drawing Sheets

CONDUCTIVE INTERIOR LINER FOR A VEHICLE

CLAIM TO PRIORITY

This application claims the benefit of U.S. Provisional Patent Application No. 60/325,602, filed Sep. 28, 2001, the entire contents of which are herein incorporated by reference.

BACKGROUND OF THE INVENTION

1. Field of the Invention

The present invention relates to an interior liner for a vehicle, such as, for example, a headliner or trim panel.

2. Description of the Related Art

Conventional interior vehicle liners are typically constructed of fiberglass or multi-layered laminated panels incorporating fiberglass and foam resin layers. These conventional liners, such as a vehicle headliner, typically have electrical wiring to conduct electricity from a power source to an electrical component. For example, interior lighting is electrically connected to the battery of a vehicle by conventional copper wire. The copper wire extends from the power source and is attached to and contained by the vehicle headliner such that the copper wire is hidden from view. However, the attachment of this wiring presents several problems. First, the attachment requires some type of attachment means. Adhesives are typically used for this purpose. However, the use of adhesives may not always result in a secure attachment of the wiring to the headliner. Further, the adhesion may become undone as the adhesive loses its adhesive characteristics. Loose wiring can give rise to rattle noise as the wiring moves within the headliner.

Other problems include packaging with head impact energy management, air curtains (which provide curtains that drop down from above the headliners during vehicle impact to provide occupant protection), and conduit drains (to allow water to drain from sunroofs and moon roofs). Further, loose wiring can be difficult to locate for repair work. In addition, loose wiring can result in physical interference problems with other components Flat wire, flexible printed circuit, and ribbon wire have been investigated to reduce the problems of typical electrical wiring. However, these approaches still require electrical wire and the proper attachment thereof, and thus the problems of loose wiring are not eliminated using these approaches.

SUMMARY OF THE INVENTION

The present invention comprises a conductive liner comprising a core layer between two electrically conductive layers. At least one of the two electrically conductive layers comprises conductive particles. The two electrically conductive layers are capable of conducting sufficient electricity to power at least one electrical component in a vehicle. In a preferred embodiment, the conductive particles are fibers, such as carbon fibers, or the like that are preferably homogeneously dispersed within the conductive layer. Such conductive fiber layers provide structural reinforcement to the liner, in addition to providing electrical conductivity. The conductive liner can further include a top and bottom scrim/adhesive layer, as well as a decorative, cover material layer.

The present invention eliminates the need for a separate wiring and wire harness as in conventional liners. When the conductive layer comprises reinforcing fiber, the present invention also eliminates the need to have non-conductive reinforcing material, such as fiberglass reinforcing layers to sandwich the core layer of the liner.

A method of making the electrically conductive liner of the invention is also disclosed.

DESCRIPTION OF THE PREFERRED EMBODIMENT

Figure 1:
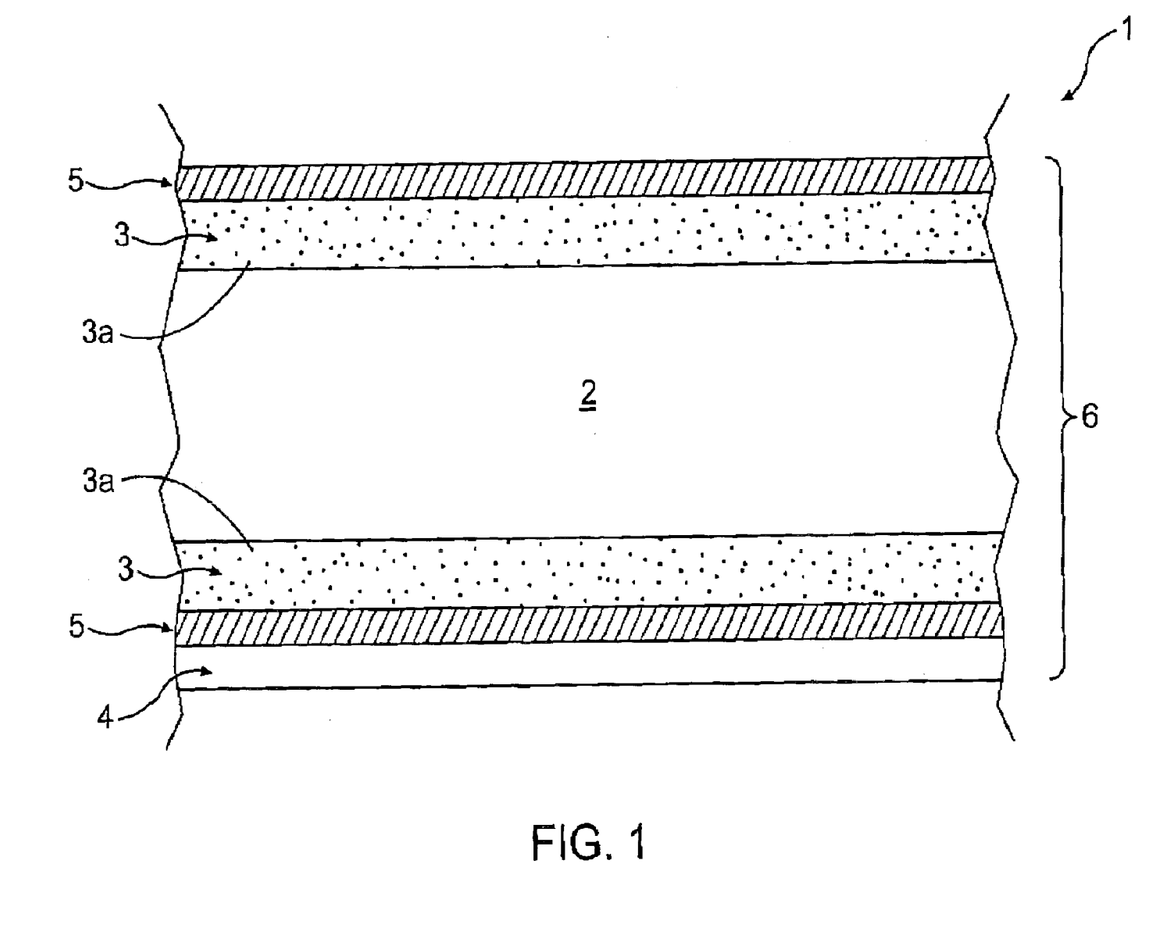
FIG. 1 illustrates a preferred embodiment of a conductive liner of the present invention.

FIG. 1 illustrates a cut-a-away view of one embodiment of a conductive liner 1 of the present invention. Conductive liner 1 comprises a core layer 2 between two electrically conductive layers 3 with conductive particles 3a that are capable of conducting electricity from a power source to various electrical components in a vehicle. In a preferred embodiment the conductive particles are fibers, such as carbon fibers a the like. Conductive fiber layers, such as carbon fiber layers 3 provide structural reinforcement to the liner, in addition to providing electrical conductivity. In one embodiment, the carbon fibers are homogeneously dispersed in each carbon fiber layer 3 to provide sufficient strength and electrical conductivity throughout the layer 3. It is to be recognized that any electrically conductive fiber material that also increases the structural reinforcement of the liner can be used in accordance with the present invention. Thus, while the following description is directed to carbon fiber layers, the present invention is not limited thereto.

The use of carbon fiber in accordance with the present invention provides a multitude of benefits. Because the carbon fiber provides both structural reinforcement and electrical conductivity, there is no longer a need for wires within the headliners as in the prior art. Additionally, because the carbon fiber conductive layer 3 acts as reinforcement for the liner 1, the present invention also eliminates the need to use non-conductive reinforcing material, such as fiberglass reinforcing layers, to sandwich the core layer of the liner. Further, carbon fiber is a stronger reinforcement than fiberglass. Thus, the interior liner 1 of the present invention can be thinner and/or weigh less and still provide sufficient structural reinforcement as in conventional liners.

A purpose of the combination of the core layer 2 and two carbon fiber layers 3 is to provide a structure that has sufficient thickness and strength to prevent bending of the liner 1, and which provides a structure with a suitable moment of inertia. In a preferred embodiment, the core layer 2 is made from an electrically non-conductive material that provides acoustical absorbance. Examples of materials for the core layer 2 include, but are not limited to, polyurethane and polyester fiber.

The conductive liner 1 can further include a top and bottom scrim/adhesive layer 5, as well as a decorative, cover material layer 4. The layers 2–5 described above comprise a layered material combination 6. The scrim/adhesive layers 5 are preferably layers that contain or encapsulate the fibers in the fiber layers 3. In other words, the fibers are maintained in place in the fiber layers 3 by the scrim/adhesive layers 5. An example of a material for the adhesive used for the scrim/adhesive layer 5 is polyethylene. The scrim material used preferably helps release the adhesive material from the tooling. An example of a scrim material for a scrim/adhesive layer 5 is a lightweight polyester. It will be appreciated that the scrim/adhesive layer 5 can be omitted and that the cover material layer 4 can be attached directly to the fiber layer 3 using an adhesive.

The liner 1 of the present invention can be used to provide electrical conductivity in headliners, as well as trim panels of vehicles. For example, the conductive liner of the present invention can be incorporated into pillars and side panels of vehicles, thereby eliminating the need for wires and wiring harnesses in conventional vehicle components. By way of further example, the conductive liner 1 of the present invention can be substituted for the wire harness disclosed in U.S. Pat. No. 6,107,569, the trim panel connecting link disclosed in U.S. Pat. No. 5,415,554, or the trim panel with integrally formed electrical connectors disclosed in U.S. Pat. No. 6,036,501, all of which are incorporated herein by reference. The present invention can thus provide electrical connections between a headliner electric circuit and a vehicle electric circuit.

A typical vehicle headliner, for instance, is wired for power and ground, along with having courtesy conductor wiring. The present invention eliminates the need for the headliner 1 to be wired for power and the need to have courtesy wiring, while having a ground to the vehicle body. For example, a vehicle requiring a courtesy lamp can use the two carbon fiber layers as courtesy and ground electrical connections.

For example, in one application of the invention, either the top or the bottom carbon fiber layer 3 can be electrically connected to a positive terminal of a power source, and the other carbon fiber layer 3 can be electrically connected to the negative terminal of a power source. The electrical circuit formed between a power source, the carbon fiber layers 3 and one or more electrical vehicle components can be controlled by a switch, including an event driven switch (for example, a switch that turns an overhead light on upon the opening of a vehicle door) as known to those of skill in the art.

Figure 2:
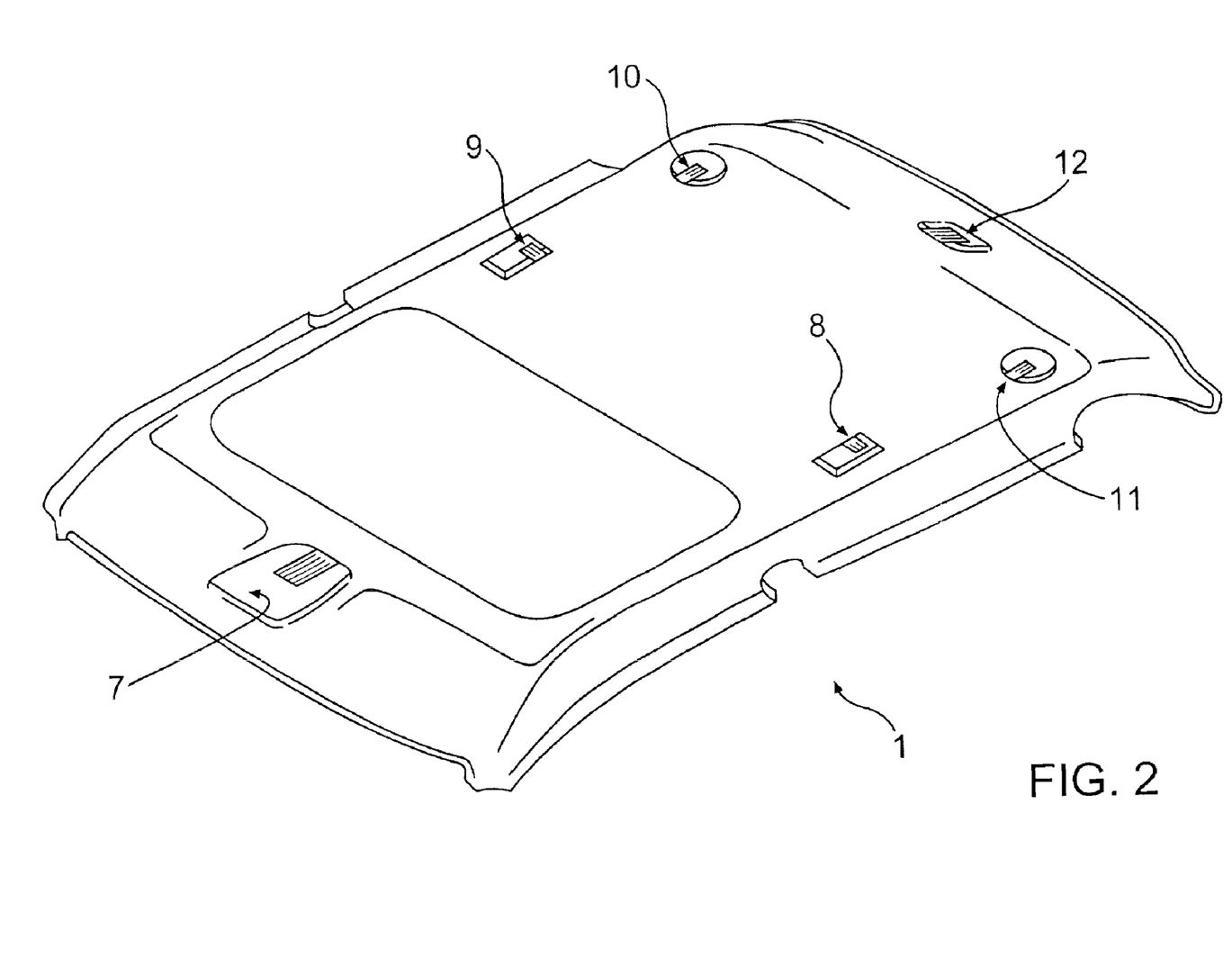
FIG. 2 is a perspective view of the conductive liner prior to fitting electrical components into the liner.
Figure 3:
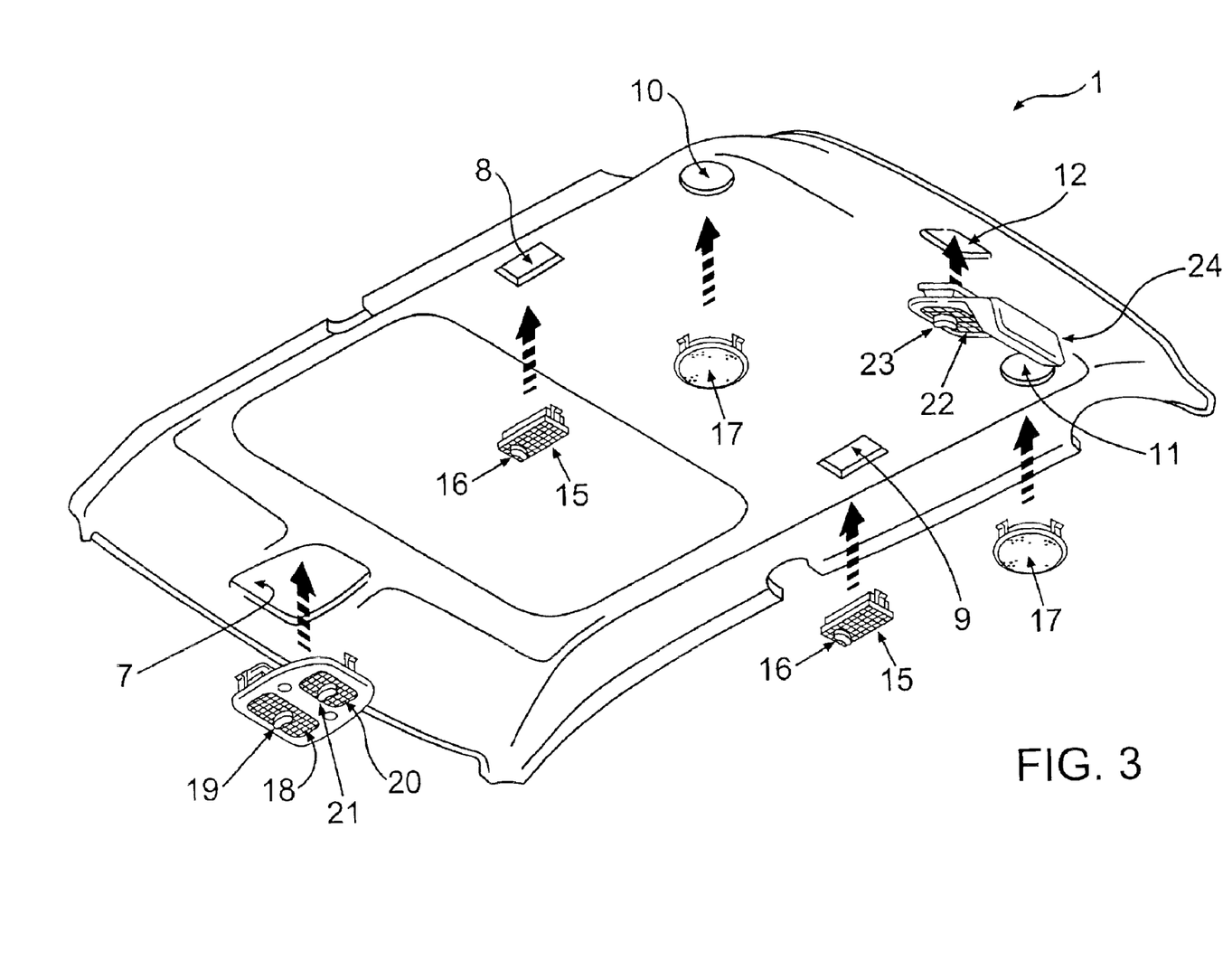
FIG. 3 is a perspective view of the conductive liner showing how various electrical components are fitted into the liner.

FIGS. 2 and 3 shows a headliner 1 which is made up of the layered material combination 6 described above and depicted in FIG. 1. Headliner 1 incorporates openings 7, 8, 9, 10, 11 and 12. The layered material combination 6 extends into the openings 7 through 12. As shown in FIG. 3, the openings 8 and 9 are intended to receive overhead lights 15 which incorporate a switch 16, while openings 10 and 11 are intended to receive loudspeakers 17 of a radio in the vehicle.

The opening 7 is intended to receive an assembly comprising a first overhead light 18 with a switch 19 and a second overhead light 20 with a switch 21. The opening 12 is intended to receive an overhead light 22 with a switch 23 and a vehicle brake light repeater 24.

Figure 4:
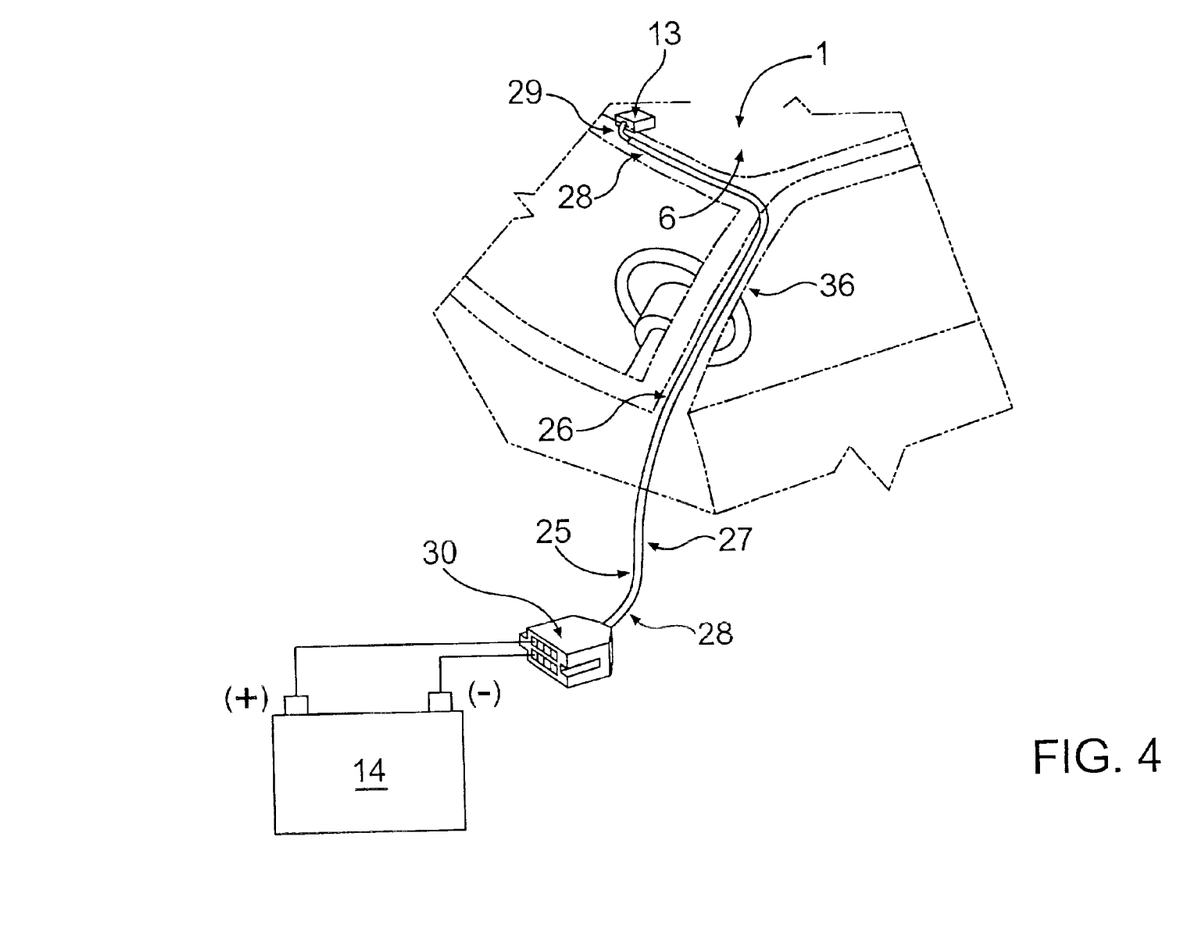
FIG. 4 is a perspective view showing how the conductive liner is assembled to the vehicle body harness.

As shown in FIGS. 3 and 4, the carbon fiber layers 3 of layered material combination 6 are electrically connected to the vehicle components or accessories, i.e., overhead lights 15, loudspeakers 17, and overhead light 18. The electrical connection between the carbon fiber layers of layered material combination 6 and the vehicle components 15, 17 and 18 can be made using any suitable electrical connection.

A wire harness 25 is generally shown in FIG. 4 comprising a continuous, molded, polymer sheath 27. The sheath 27 encases a plurality of wires or ribbon connectors 29 which are routed to form a main trunk 26 continuous with a branch 28, which terminates in an electrical connector 13. Electrical connector 13 electrically connects wires or ribbon connectors 29 with carbon fiber layers 3 of layered material combination 6.

The wire harness 25 is routed through a pillar 36 in a vehicle, such as the A-pillar, as shown. The wire harness 25 may also be routed through any of the pillars in the vehicle. The wire harness 25 provides power and control signals to electronic devices located in the headliner, the roof or the rearview mirror, such as, for example, an electronic message center, sunroof, dimmable rearview mirror, interior lighting, speakers, or the like. A further description of the wire harness and pillar construction is set forth in U.S. Pat. No. 6,107,569, which is incorporated herein by reference. Electrical connector 30 electrically connects power source 14 with branch 28.

The conductive liner 1 of the present invention reduces the likelihood of damage to the electrical connections during assembly of the liner. Further, the present invention reduces the potential for BSR (buzz, squeak, rattle) because the wiring in the liner 1 is substantially eliminated. Indeed, the only wiring in the headliner in one embodiment is the wire or ribbon connection to connector 13. In an alternative embodiment, the wire or ribbon connection 13 can be located in a vehicle pillar or located between the electrical power supply and the pillar, thereby further reducing wiring in the headliner.

Further, because the carbon fiber layers 3 comprise reinforcing carbon fibers, the headliner 1 of the present invention will have improved head impact performance.

Connector 13 has means for fixing the wire or ribbon connectors 29 thereto. An example of such a fixing means is described in U.S. Pat. No. 6,273,499, which is incorporated herein by reference.

In accordance with the present invention, electricity flows through electrical connector 13, and to electrical contacts (not shown) of the electrical components in the headliner via carbon fiber layers 3. In accordance with the present invention, carbon fiber layers 3 can be substituted for the wire or ribbon connectors described in U.S. Pat. No. 6,273,499.

The headliner 1 can be shipped with all the overhead lights, loudspeakers, or the like. already mounted in the corresponding openings and connected to the carbon fiber layers 3. The headliner 1 can be placed against the roof by automated or manual means and all the electrical connections are made by placing a portion of each of the two carbon fiber layers 3 into contact with the contacts of connector 13.

Figure 5:
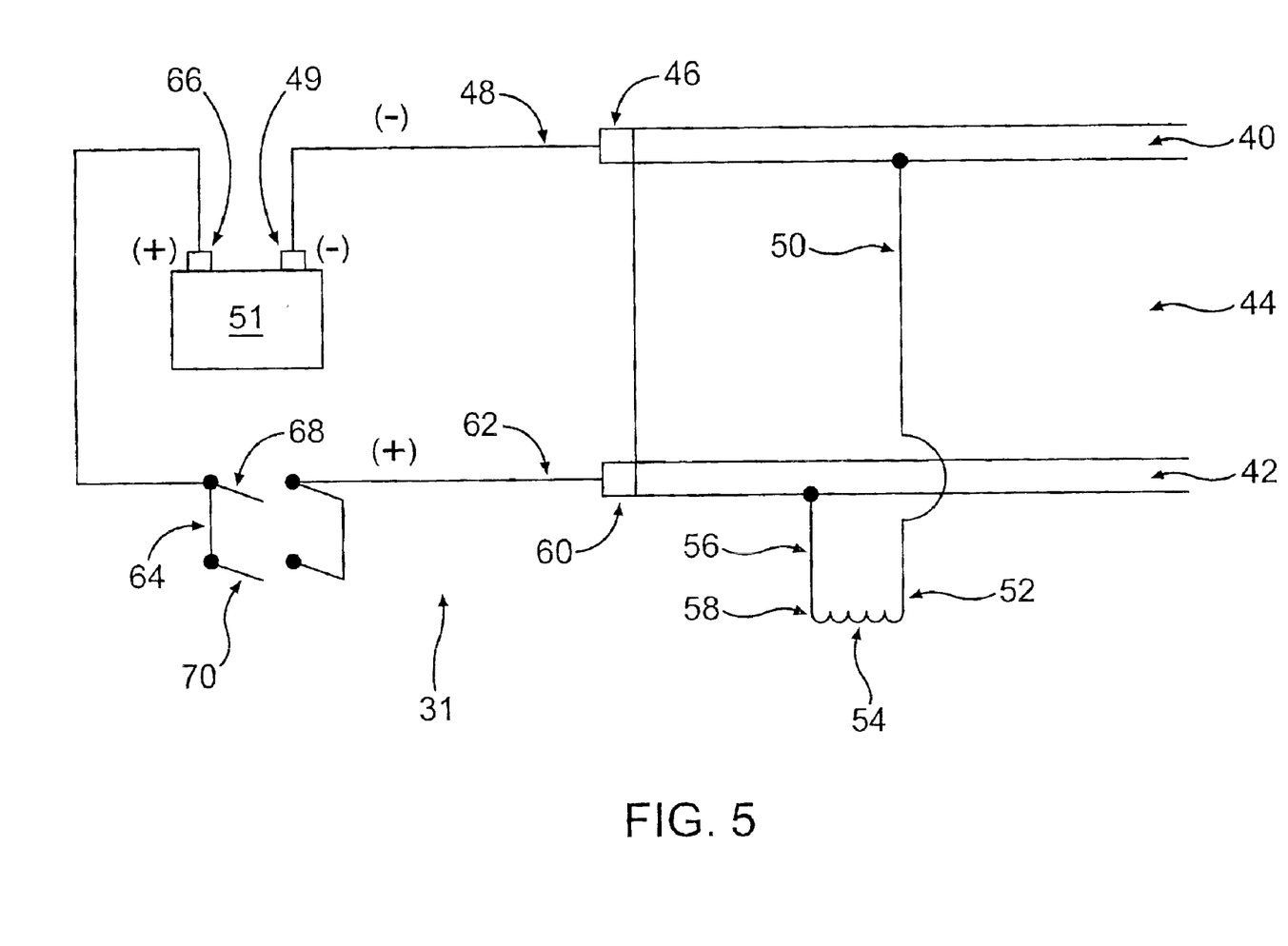
FIG. 5 illustrates a circuit in accordance with a preferred embodiment of the invention having two conductive layers.

FIG. 5 illustrates a circuit 31 in accordance with one embodiment of the invention having two conductive layers 40 and 42. Between the conductive layers 40 and 42 is a core layer 44. The upper conductive layer 40 is electrically connected via a connector 46 to a negative wire 48. Negative wire 48 is electrically connected to the negative side 49 of a power source 51. The upper conductive layer 40 is electrically connected via electrical line 50 to the negative side 52 of an electrical accessory 54. Electrical accessory 54 is any accessory in a vehicle headliner, including but not limited to overhead lights, sunroofs, moon roofs, brake lights, loudspeakers, or the like. The lower conductive layer 42 is electrically connected via electrical line 56 to the positive side 58 of electrical accessory 54. Electrical lines 50 and 56 can comprise electrically conductive particles (such as carbon fiber and the like), wire, ribbon connectors, or the like. The lower conductive layer 42 is electrically connected via connector 60 to a positive wire 62. Positive wire 62 is electrically connected via switch 64 to a positive side 66 of power source 51. As shown in FIG. 5, switch 64 can comprise a doorjamb switch 68 and a manual override switch 70. Closing door jamb switch 68 and/or closing the manual override switch 70 will close the electrical circuit 31, and permit a sufficient amount of electricity to power electrical accessory 54. While conductive layer 42 is shown to be electrically connected to the positive side of power source 51 and electrical accessory 54, and conductive layer 40 is shown to be electrically connected to the negative side of power source 51 and electrical accessory 54, the electrical connections can be switched.

Figure 6:
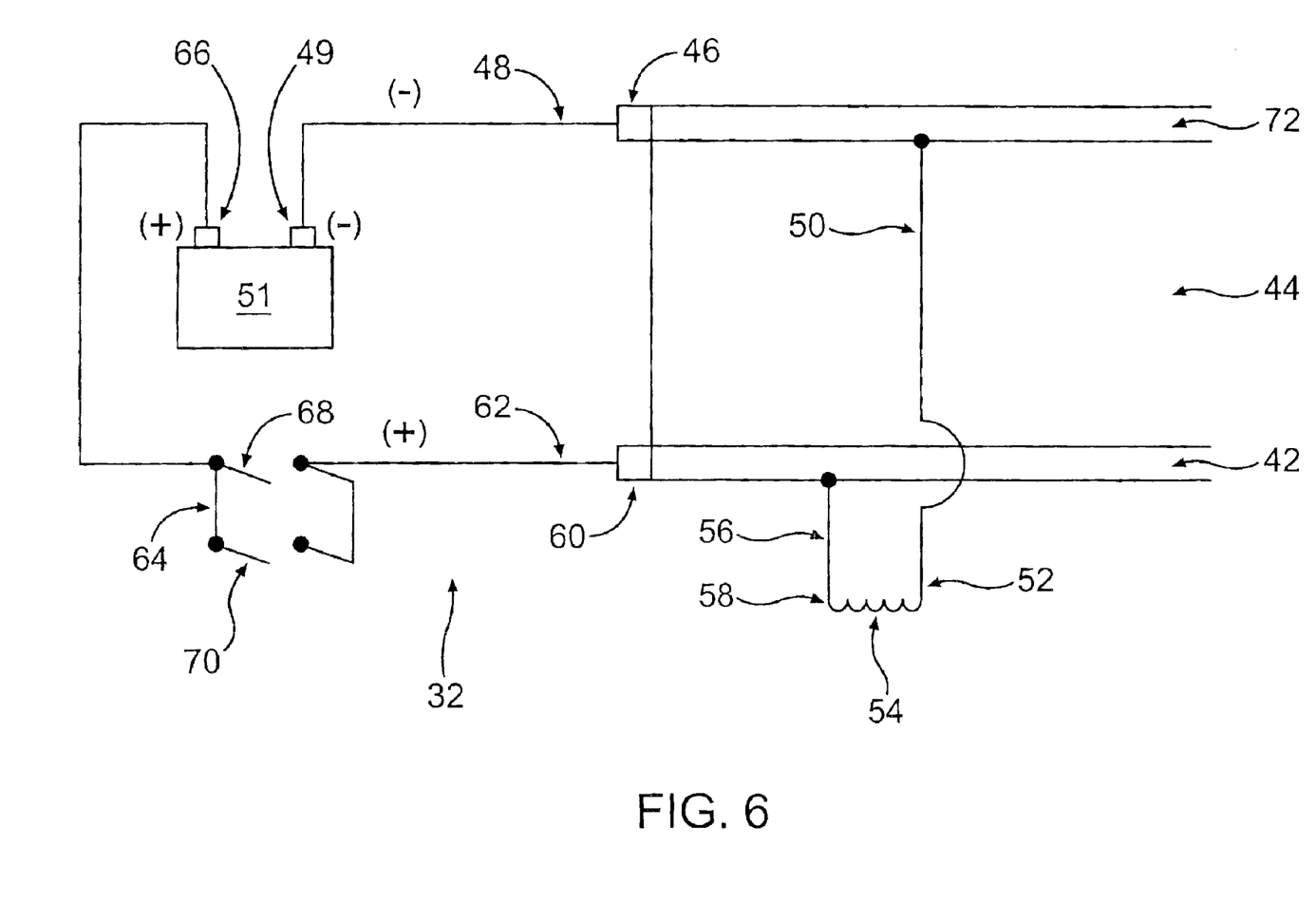
FIG. 6 illustrates a circuit in accordance with another preferred embodiment of the invention having one conductive layer and using the roof sheet metal as the other conductive layer to complete the circuit.

FIG. 6 illustrates a circuit 32 in accordance with another embodiment of the invention having one conductive layer 42 and using the roof sheet metal 72 as the other conductive layer to complete the circuit 32. Circuit 32 is the same as circuit 31 (shown in FIG. 5) in all other respects.

Figure 7:
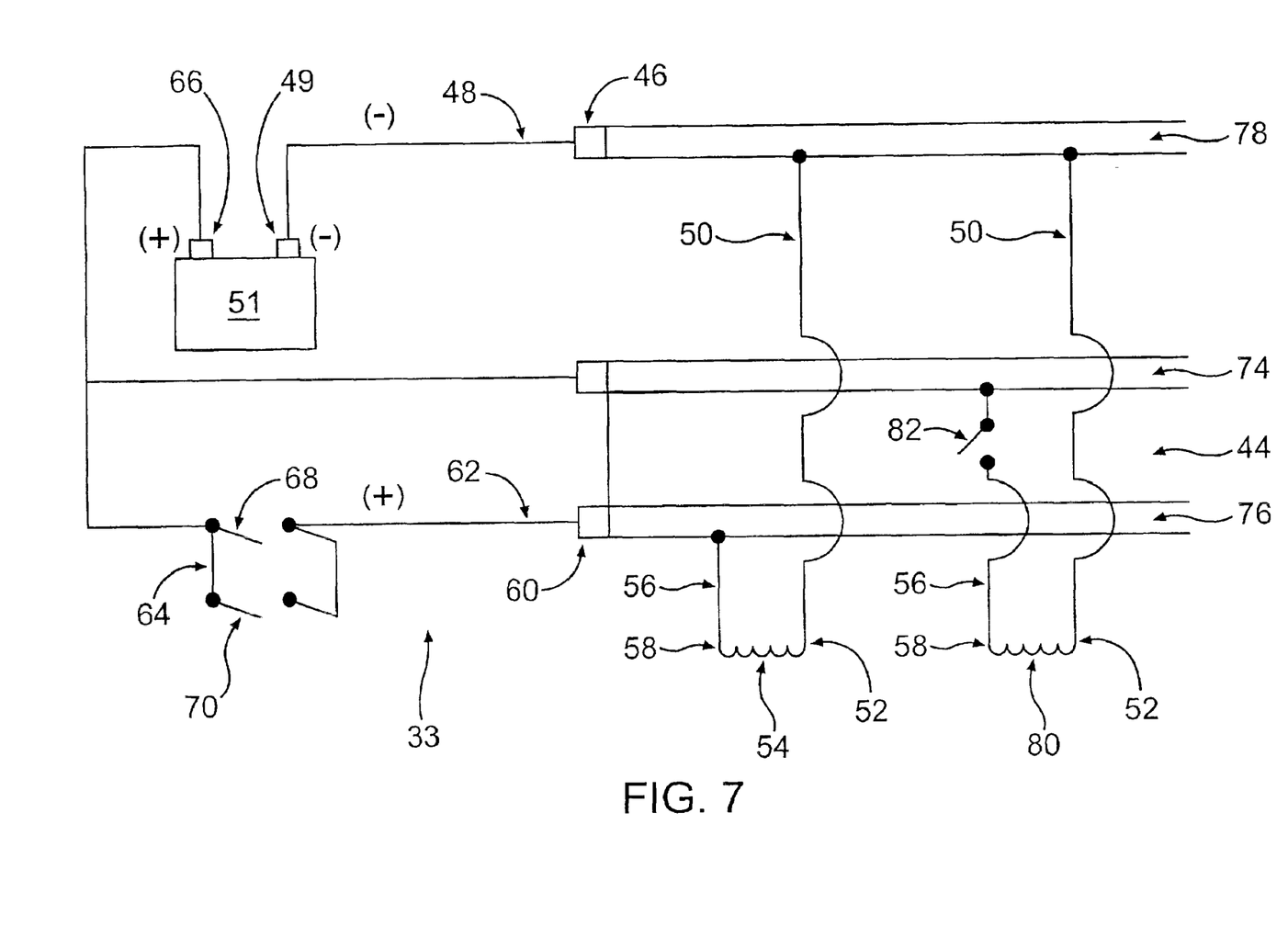
FIG. 7 illustrates a circuit in accordance with a preferred embodiment of the invention having three conductive layers, wherein two of the conductive layers comprise conductive particles, and the third conductive layer is the roof sheet metal.

FIG. 7 illustrates a circuit 33 in accordance with an additional embodiment of the invention having three conductive layers 74, 76 and 78. Conductive layers 74 and 76 comprise conductive particles. Conductive layer 78 can comprise conductive particles or roof sheet metal. This embodiment is similar to the embodiments shown in FIGS. 5 and 6. However, in this embodiment, conductive layers 74 and 76 are electrically connected to the positive side of power source 51 while conductive layer 78 is electrically connected to the negative side of power source 51, although other connection schemes can just as readily be made. In the example illustrated in FIG. 7, both electrical accessories 54 and 80 connect to negative conductive layer 78, but electrical accessory 54 connects to positive conductive layer 76 while electrical accessory 80 connects to positive conductive layer 74 through switch 82. According to this arrangement, electrical accessory 54 is controlled through switch 64 that includes the door jamb switch 68 and manual override switch 70. In contrast, electrical accessory 80, which can be, for instance, a map light, is turned on and off by simply manually closing and opening switch 82.

Figure 8:
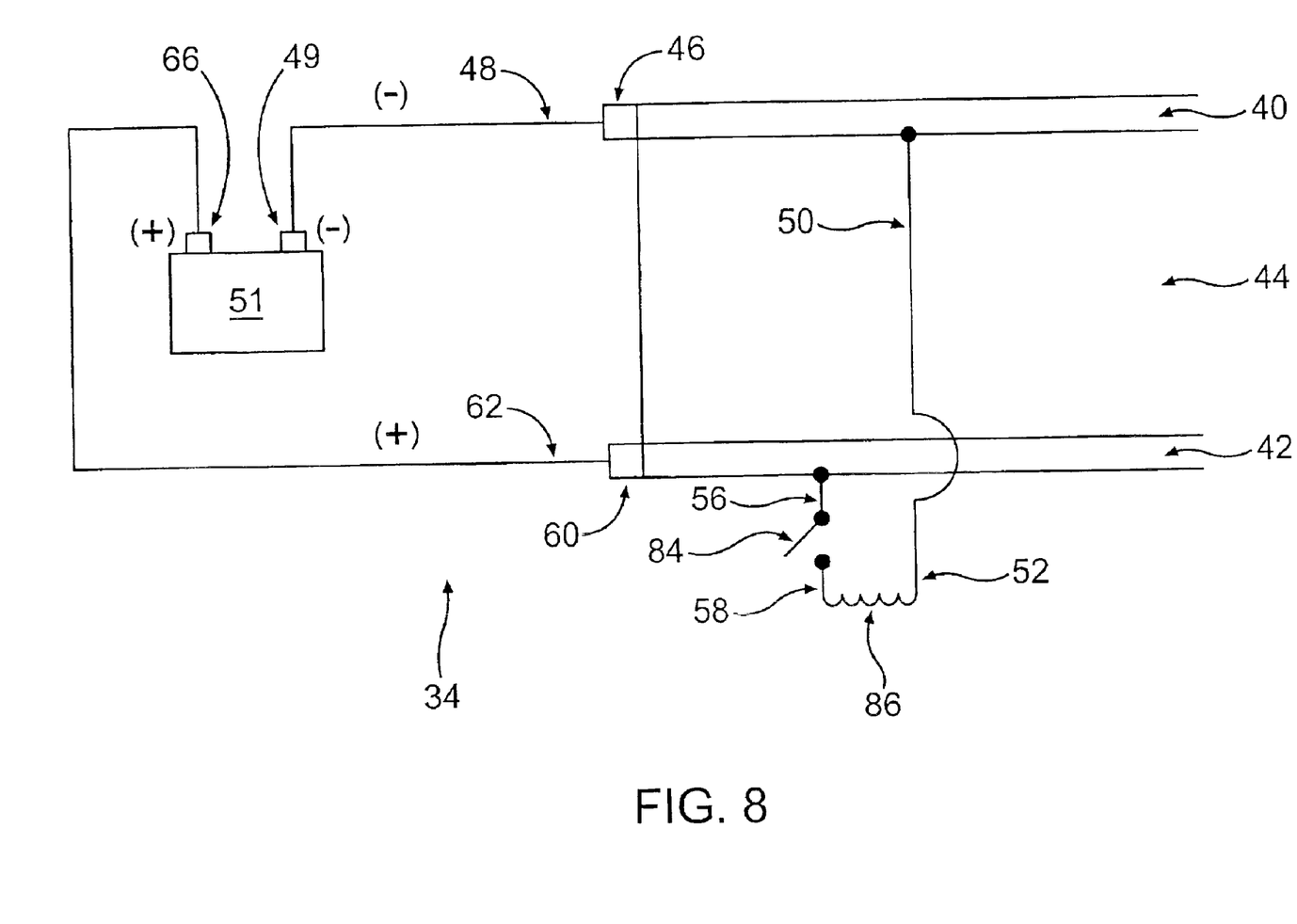
FIG. 8 illustrates a circuit in accordance with a preferred embodiment of the invention, wherein a switch is closed at a vehicle accessory to complete the electrical connection between two conductive layers.

FIG. 8 illustrates a circuit 34 in accordance with a further embodiment of the invention, wherein a switch 84 is allocated with or is part of vehicle accessory 86, with closing of switch 84 completing the electrical connection between the two conductive layers 40 and 42. While FIG. 8 shows circuit 34 providing electricity to power only one vehicle accessory, it is contemplated that circuit 34 can provide electricity to power more than one vehicle accessory by closing switches at each vehicle accessory.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of providing power to an electrical component mounted to an electrically conductive liner of a vehicle, comprising the steps of:

connecting a positive voltage input of said electrical component to a first conductive layer of said liner of said vehicle;

connecting a negative voltage input of said electrical component to a second conductive layer of said liner of said vehicle, wherein said first and second conductive layers include electrically conductive particles that are capable of conducting sufficient electrical current to power at least one electrical component while providing structural reinforcement for said liner;

providing electrical current from a power source to said electrical component through said first conductive layer of said liner of said vehicle; and providing electrical current from said electrical component through said second conductive layer of said liner of said vehicle to said power source.

2. A method of making an interior vehicle liner; comprising the steps of:

forming first arid second layers of said interior vehicle liner at least partially made of an electrically conductive material including electrically conductive particles that are capable of conducting sufficient electrical current to power at least one electrical component while providing structural reinforcement for said liner;

forming a core layer of said interior vehicle liner out of an electrically insulating material;

attaching said first layer to a first side of said core layer; and attaching said second layer to a second side of said core layer.

3. The method according to claim 2, further comprising the step of attaching a scrim/adhesive layer to one of said first and second layers.

4. The method according to claim 3, further comprising the step of attaching a cover material layer to said scrim/adhesive layer.

5. The method according to claim 2, wherein said electrically conductive particles comprise carbon fibers.

6. An interior liner for a vehicle, comprising:

a core layer having a first side and a second side;

a first electrically conductive layer attached to said first side of said core layer; and a second electrically conductive layer attached to said second side of said core layer, wherein at least one of said first and second electrically conductive layers include electrically conductive particles that are capable of conducting sufficient electrical current to power at least one electrical component while providing structural reinforcement for said liner.

7. The interior liner according to claim 6, wherein said conductive particles comprises electrically conductive fibers.

8. The interior liner according to claim 7, wherein said fibers comprise carbon fibers.

9. The interior liner according to claim 8, wherein said carbon fibers are homogeneously dispersed within said first and second electrically conductive layers.

10. The interior liner according to claim 6, wherein said core layer is comprised of an acoustical absorbent material.

11. The interior liner according to claim 6, further comprising a scrim/adhesive layer attached to one of said first or second electrically conductive layers.

12. The interior liner according to claim 11, further comprising a cover layer attached to said scrim/adhesive layer.

13. The interior liner according to claim 6, further comprising a third electrically conductive layer spaced apart from said first and second electrically conductive layers.

14. The interior liner according to claim 6, wherein said liner comprises a vehicle headliner.

15. The interior liner according to claim 6, wherein said liner comprises a vehicle trim panel.

* * * * *